United States Patent
Moscovici et al.

(10) Patent No.: US 9,548,906 B2
(45) Date of Patent: Jan. 17, 2017

(54) HIGH AVAILABILITY MULTI-PARTITION NETWORKING DEVICE WITH RESERVE PARTITION AND METHOD FOR OPERATING

(71) Applicants: Avishay Moscovici, Tel Aviv (IL); Nir Erez, Zur Moshe (IL)

(72) Inventors: Avishay Moscovici, Tel Aviv (IL); Nir Erez, Zur Moshe (IL)

(73) Assignee: NXP USA, INC., Austin, TX (US)

( * ) Notice: Subject to any disclaimer, the term of this patent is extended or adjusted under 35 U.S.C. 154(b) by 123 days.

(21) Appl. No.: 14/551,645

(22) Filed: Nov. 24, 2014

(65) Prior Publication Data
US 2016/0149773 A1    May 26, 2016

(51) Int. Cl.
| | | |
|---|---|---|
| G06F 11/07 | (2006.01) | |
| H04L 12/24 | (2006.01) | |
| H04L 29/08 | (2006.01) | |
| G06F 11/20 | (2006.01) | |
| G06F 9/46 | (2006.01) | |
| H04L 29/14 | (2006.01) | |
| H04L 12/861 | (2013.01) | |

(52) U.S. Cl.
CPC ............ H04L 41/5054 (2013.01); G06F 9/46 (2013.01); G06F 11/076 (2013.01); G06F 11/203 (2013.01); H04L 67/10 (2013.01); H04L 69/30 (2013.01); H04L 69/321 (2013.01); H04L 69/40 (2013.01); *G06F 11/0712* (2013.01); *G06F 11/0715* (2013.01); *H04L 49/90* (2013.01)

(58) Field of Classification Search
CPC ............ G06F 11/1666; G06F 11/0712; G06F 11/0715; G06F 11/0703; G06F 11/076
See application file for complete search history.

(56) References Cited

U.S. PATENT DOCUMENTS

| | | | |
|---|---|---|---|
| 6,363,495 B1 | 3/2002 | MacKenzie et al. | |
| 6,728,780 B1 | 4/2004 | Hebert | |
| 2003/0046330 A1 | 3/2003 | Hayes | |
| 2004/0088514 A1* | 5/2004 | Bullen | G06F 3/0613 |
| | | | 711/202 |
| 2005/0055406 A1* | 3/2005 | Singhai | H04L 47/10 |
| | | | 709/206 |
| 2012/0008506 A1 | 1/2012 | Astigarraga et al. | |
| 2012/0265910 A1* | 10/2012 | Galles | G06F 13/4022 |
| | | | 710/300 |

OTHER PUBLICATIONS

U.S. Appl. No. 14/499,385, filed Sep. 29, 2014, entitled "Multi-Partition Networking Device and Method Therefor".

(Continued)

*Primary Examiner* — Joseph Schell

(57) ABSTRACT

A device is described for operating a multi-partition networking system, the device comprising hardware resources for the operation of a primary partition for performing tasks, a primary buffer for holding packets for processing within a partition of the multi-partition system and a reserve buffer. The device is arranged to allocate the primary buffer for use by the primary partition and allocate the reserve buffer for use by the primary partition when at least a suspicious condition is detected in the primary partition. A method of operating a multi-partition networking system is also described.

16 Claims, 10 Drawing Sheets

(56) References Cited

OTHER PUBLICATIONS

U.S. Appl. No. 14/224,391, filed Mar. 25, 2014, entitled "Network Processor for Managing a Packet Processing Acceleration Logic Circuitry in a Networking Device".
Freescale Semiconductor, Inc. "QorIQ Data Path Acceleration Architecture" printed from <<http://www.freescale.com/webapp/sps/site/overview.jsp?code=QORIQ_DPAA>> on Mar. 26, 2014, 1 page.

* cited by examiner

US 9,548,906 B2

HIGH AVAILABILITY MULTI-PARTITION NETWORKING DEVICE WITH RESERVE PARTITION AND METHOD FOR OPERATING

CROSS REFERENCE TO RELATED APPLICATION(S)

The present application is related to co-pending U.S. patent application Ser. No. 14/499,385, entitled "MULTI-PARTITION NETWORKING DEVICE AND METHOD THEREFOR," filed on Sep. 29, 2014, and co-pending U.S. patent application Ser. No. 14/224,391, entitled "NETWORK PROCESSOR FOR MANAGING A PACKET PROCESSING ACCELERATION LOGIC CIRCUITRY IN A NETWORKING DEVICE," filed on Mar. 25, 2014, the entirety of which are herein incorporated by reference.

FIELD OF THE INVENTION

The invention relates to a multi-partition networking device for operating a multi-partition networking system, a multi-partition networking system, an integrated circuit, a method of operating a multi-partition networking system, a computer program product comprising instructions for causing a management processor to perform a method and a non-transitory tangible computer readable storage medium.

BACKGROUND OF THE INVENTION

Networks allow fast and easy electronic communication between a group or system of devices coupled via data or other communications or electronic links. Data links in this case may include electronic wires and other electronic coupling but also include radio, wireless, Bluetooth and optical links.

A simple network may include only two nodes or devices, or a small number of devices, connected by a single data link but networks can be built up to any complexity and may comprise any number of devices such as nodes, computers, processors, routers, switches, I/O devices, adaptors, converters and other such devices.

For ease of management operating system tasks within a network can be split up into logical groupings called partitions, or software partitions, and the hardware resources on which they run, such as cores, which may be single or multi-cores, memory and IO devices, may correspondingly be divided up and allocated to different partitions running on a network. Multiple operating systems may be run on different partitions and therefore a large number of tasks may be performed across the network processor.

Networking elements for the different partitions on a single system on chip (SoC) device are typically managed centrally by a manager, management device or other processor which allocates networking resources to devices and partitions within the network, manages memory and buffer allocation and further monitors network and partition operation and failure. The manager, or management device also control or couples with data path accelerator architecture (DPAA), and networking interfaces.

A partition in a network may fail and solutions are known to address this.

Published US patent application U.S. Pat. No. 6,363,495 describes a computer system arranged into a cluster of nodes for the splitting of network tasks. The nodes are arranged into partitions and self-regulate their own distribution into partitions using a cluster state map and a cluster node map. When a node fails, or when a link fails, thus cutting off a node from the remainder of a partition, the node is removed from the partition of which it is a member.

The arrangement nevertheless suffers from a computational loss due to failed nodes and ultimately may suffer from the loss of an entire partition.

SUMMARY OF THE INVENTION

The present invention provides a multi-partition networking device for operating a multi-partition networking system, a multi-partition networking system, an integrated circuit, a method of operating a multi-partition networking system, a computer program product comprising instructions for causing a management processor to perform a method and a non-transitory tangible computer readable storage medium, as described in the accompanying claims.

Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals.

DETAILED DESCRIPTION OF THE PREFERRED EMBODIMENTS

The present invention is described with reference to the accompanying drawings and figures however the present invention is not limited to the specific examples shown and described herein and as illustrated.

The embodiments shown may be implemented using electronic components, electronic circuits, transmission mechanisms, hardware, software and other technical solutions known in the art and will not be described in any greater detail than necessary to explain the present invention.

The invention may be implemented on a chip, a system on a chip, a computer or other computing device, a network node or other network component.

In the following, for sake of understanding, the device is described in operation. However, it will be apparent that the respective elements are arranged to perform the functions being described as performed by them.

Figure 1:
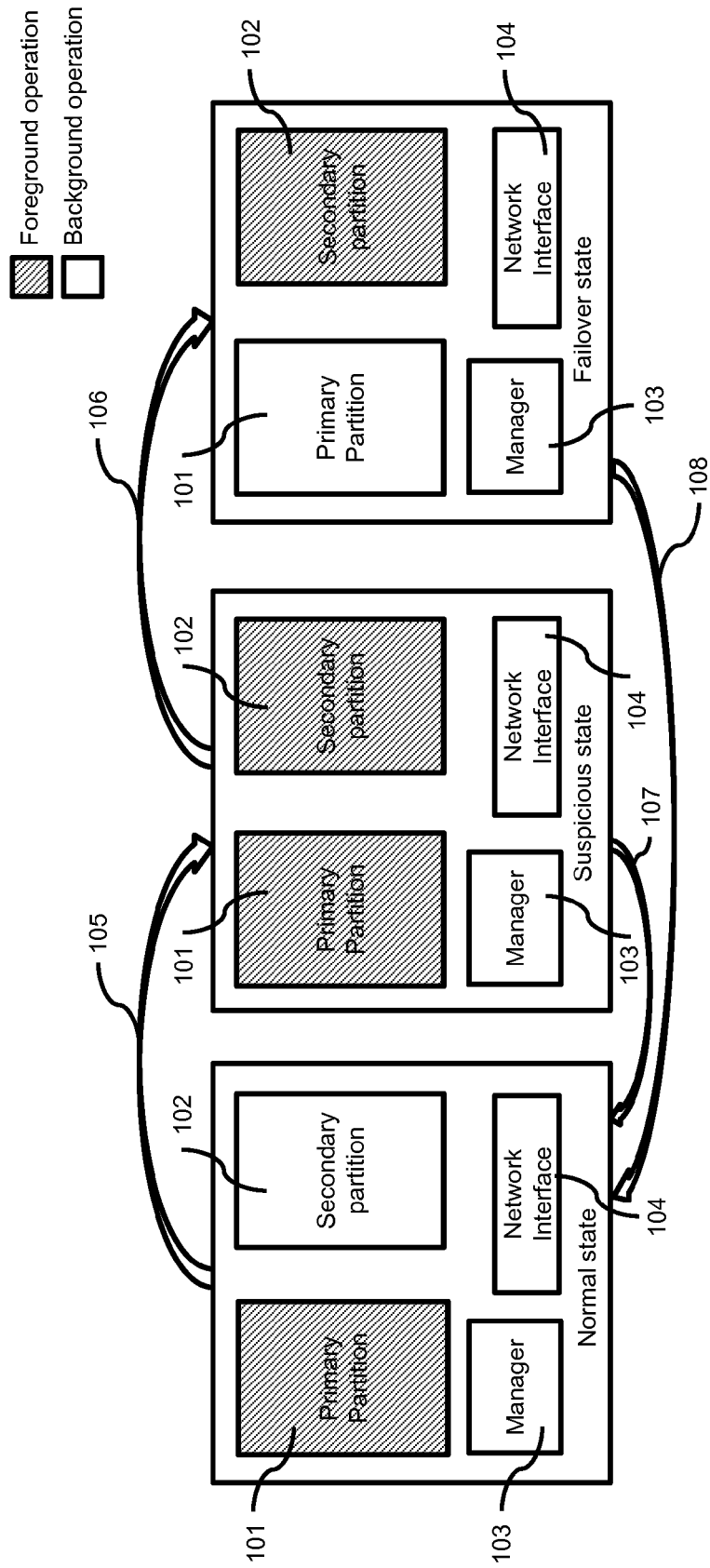
FIG. 1 schematically shows a prior art embodiment of operation of a device.

FIG. 1 schematically shows an embodiment of a multi-partition network device comprising a primary partition 101 and a secondary partition 102 arranged to take over operational tasks from the primary partition if the primary partition fails, and described in U.S. patent application Ser. No. 14/499,385, filed 29 Sep. 2014 titled: MULTI-PARTITION NETWORKING DEVICE AND METHOD THEREFOR, the contents of which are incorporated herein by reference.

Primary partition 101 operates a series of tasks while a further, or secondary, partition 102 is available but not normally in operation. The system comprising primary partition 101 and secondary partition 102 are operated by a manager 103 which may also be called a management complex. A network interface 104 is present for the system to communicate with other nodes, structures and processors of the network.

While primary partition 101 is working the system is in a normal state. If and when primary partition 101 fails a suspicious condition may be detected by the manager 103, which transfers 105 the system into a suspicious state in which the secondary partition 102 is made ready for operation. Primary partition 101 may or may not actually fail. If at a later point a failure of primary partition 101 is detected the manager 103 transfers 106 the system into a failover state in which operation of the tasks of primary partition 101 are undertaken by secondary partition 102 in lieu of operation of primary partition 101. Alternatively if, while the system is in a suspicious state, the manager 103 does not detect a failure of primary partition 101, the system is transferred 107 back into a normal state and therefore the secondary partition 102 is run down or otherwise made to desist from operation. In failover state the secondary partition 102 continues operation of the tasks of the system until such time as primary partition 101 resumes working or is found to be otherwise able to resume tasks. The system is then transferred 108 back into normal state, primary partition 101 takes over running of its tasks and secondary partition 102 desists from operation.

Figure 2:
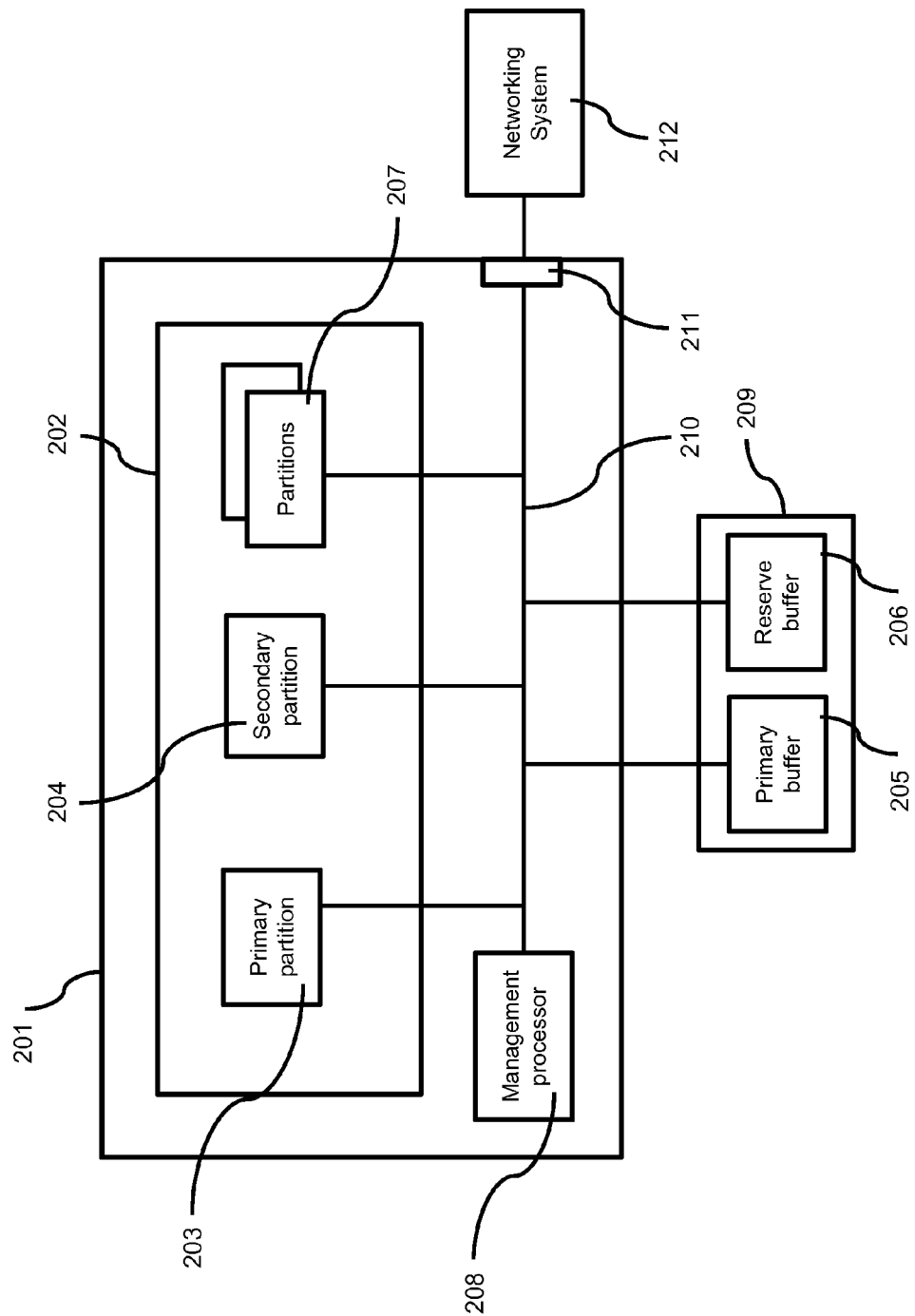
FIG. 2 schematically shows an embodiment of a device.

FIG. 2 schematically shows an exemplary device 201, which may be formed out of circuits, in particular an integrated circuit or a group of integrated circuits, chips, microchips or other known computing solutions, for operating a multi-partition networking system. Device 201 comprises hardware resources 202 for the operation of a primary partition 203 for performing tasks within a multi-partition networking system, a primary buffer 205 for holding packets for processing within a partition of the multi-partition system, which in an embodiment is primary partition 203, and a reserve buffer 206.

A partition is an operating system with a kernel that may host virtual machines on its user space and is typically a logical subset of hardware resources in a computer or other computational device and in an embodiment hardware resources 202 may include cores, multi-cores, stacks, command layers, and input and output devices. However, and as will be understood, hardware resources 202 may include any devices required and understood for supporting a partition or software partition.

Device 201 may also include management processor 208 for managing partitions. Management processor 208 may be a processor, a CPU or other computing device designed to perform management functions within the networking SoC and is coupled to primary partition 203 and to primary buffer 205 and reserve buffer 206 by bus 210.

Buffers 205 and 206 may be a single buffer, a buffer pool or a buffer pool set and may be of a large number, and may be a memory space provided, set aside or otherwise made available for the temporary storage of packets awaiting processing by a partition, the packets having been created in the partition or having been received from elsewhere in the network, or awaiting transmission over networks or over network lines.

Buffers 205 and 206 may be allocated in system memory 209 which may be situated on the same chip, integrated circuit or component as device 201, or may be on a separate chip, integrated circuit or component, connected or coupled by suitable electronic wires or a bus. In an alternative embodiment the device itself may have a small amount of memory that may be used as memory or buffer space for a partition.

Management processor 208 is arranged to allocate primary buffer 205 for use by primary partition 203 during its operation or working of allocated operational tasks. In an embodiment, primary partition 203 may be arranged to execute a number of such tasks and is assigned a buffer pool set comprising a number of buffer pools. Each task may have its own buffer pool within the buffer pool set.

During operation of device 201, or of the network, primary partition 203 may fail or otherwise become unable to perform its allocated tasks. When this occurs then management processor 208 may detect a suspicious condition in primary partition 203. If a suspicious condition is detected in primary partition 203 then management processor 208 may allocate reserve buffer 206 for use by the primary partition 203. The reserve buffer 206 is allocated for use by the primary partition 203 when at least a suspicious condition is detected in the primary partition 203. Allocation of reserve buffer 206 allows primary partition 203 to use the available storage in reserve buffer 206 in addition to the available storage in primary buffer 205.

The device 201 may be comprised in a router or switches in a network and for example may be comprised in a data centre, a base stations, a wireless LAN routers or in any other network node.

In an embodiment, detection of a suspicious condition may be performed by a management complex comprised in device 201, or other manager arranged to manage the resources of the partitions or DPAA.

Other tasks may occurs when a suspicious condition is detected, for example a reserve, or secondary, partition 204 may be run up, put into a preparation state or put into a reserve or holding condition, until such time as the device acquires, detects or otherwise receives confirmation that primary partition 203 either has failed or not failed.

If management processor 208 receives confirmation that the primary partition has failed then the device may transfer the working or the tasks of the primary partition 203 over to the secondary partition 204. Alternatively, if the management processor 208 receives confirmation that the primary partition has not failed then the management processor 208 causes the secondary partition 204 to stand down, or otherwise takes the reserve or secondary partition out of run up or preparation state.

Device 201 may be comprised in a chip or on a board with other elements that may compose a system. Other elements may include system, or other, memory 209, and other components and devices known in the art, which may include an Ethernet physical interface.

Figure 3:
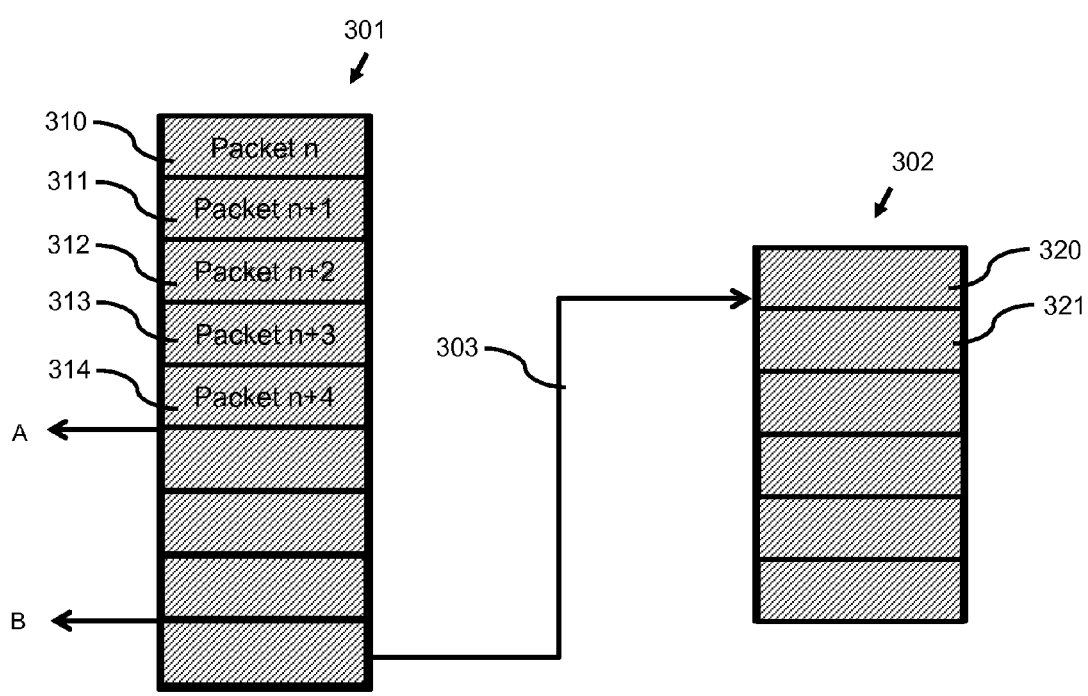
FIG. 3 schematically shows an embodiment of a buffer.

FIG. 3 schematically shows an exemplary embodiment of a buffer 301.

In an embodiment, buffer 301 may handle packets on a first in first out basis (FIFO) in which stored packets may be handled in the order in which they are received or created and inputted into buffer 301. Packets may be inputted, or filled, into the buffer in the order in which they arrive, are received, or are created and FIG. 3 shows a schematic representation of 5 packets in total, packets n 310, n+1 311, n+2 312, n+3 313 and n+4 314 situated in memory. In an alternative embodiment buffer 301 is a buffer pool list, which is a list of pointers to buffers, or memory space, where the packets will be stored and which efficiently allows a buffer to be created as a fragmented collection of memory.

In an embodiment, a management processor may recognise that a suspicious condition exists in the primary partition when the primary buffer is filled to a pre-determined packet limit. In a further embodiment the management processor may recognise that a suspicious condition exists because the number of packets residing in the buffer accessed or used by the primary partition increases to a level which indicates that packets are not being copied out of the buffer and processed. In an embodiment a pre-determined number of packets, shown in FIG. 3 as A, is used as a Suspicion Threshold. When the number of packets in buffer 301 reaches A the device recognises a suspicious condition. Any number of packets in buffer 301 may be used as A.

Once a management processor recognises that a suspicious condition occurs it may allocate reserve buffer 302 for use by the same partition to which buffer 301 is allocated. In an embodiment reserve buffer 302 may be allocated to the partition by making a linkage 303 between reserve buffer 302 and buffer 301. Allocating reserve buffer 302 makes available extra space, for example 320, 321, for further packets.

In an embodiment, the management processor may also start run up of the secondary partition upon detecting that buffer 301 has reached A, shown in FIG. 3. This may be useful under circumstances when it may take a long time to run up a secondary partition or otherwise provide back up support for the primary partition. Under these circumstances it may be known that the extra memory space provided by the reserve buffer will be used by the primary partition and in this case the decision to allocate reserve, or extra, buffer space to the primary partition may be taken immediately upon detection of a suspicious condition in the primary partition. This saves signaling when it is already known in advance that the reserve buffer will be needed.

However, it is not necessary for the device to allocate the extra buffer as soon as buffer 301 reaches limit A.

In an embodiment, a management processor may allocate a reserve buffer for use by a primary partition also upon the further condition that the primary buffer is filled to a pre-determined packet limit. In an embodiment the pre-determined packet limit can be any pre-determined packet limit. Under these circumstances the reserve buffer will only be allocated to the primary partition when an indication is received that the primary buffer will be filled and the reserve buffer space will be needed to avoid packet loss. This embodiment saves signaling and resources because the reserve buffer is not allocated until it is needed.

In a particular embodiment, the pre-determined packet limit is a value equal to one packet less than the maximum number of packets that the primary buffer can hold. This allows the reserve buffer to be allocated only when there is actually a threat of imminent packet loss.

In a particular embodiment, the pre-determined packet limit may be termed the network protect threshold.

In FIG. 3 the pre-determined packet limit is shown as B, and is shown as being equal to a number of packets, which is one packet less than the maximum number of packets that the buffer 301 can hold.

The pre-determined threshold, or network protection threshold, is an indication of how full the buffer, or primary buffer, has become during operation of the partition and therefore gives an indication of whether the partition is working adequately, sufficiently or otherwise correctly.

When the number of packets in buffer 301 reaches pre-determined threshold B the integrity of the buffer is under threat and there is a danger that packets will be lost. By allocating reserve buffer 302 to buffer 301 packets are not lost and flow in the direction of the partition served by buffer 301 is maintained.

In an embodiment a buffer pool may be composed of a large number of buffers that may be located in a system memory. The system memory may be implemented as a memory device such as a Dual Data Rate (DDR) or Double Data Rate memory, or may be a Static RAM (SRAM). In an embodiment, the buffer pool may comprise a list of pointers to buffers or other memory space.

In further embodiments a suspicious condition in a partition may be detected in any of several ways and with reference to FIG. 2, device 201 may detect a failure in primary partition 203 by detection that primary buffer 205 is not being served or detection that packets are not flowing into or out of the primary partition 203.

In an embodiment, there may be a plurality of further partitions 207 residing on or carried by hardware resources 202 and management processor 208 may be arranged to allocate reserve buffer 206 to any partition of the plurality 207 when at least a suspicious condition is detected in that partition. In that way management processor 208 may serve a number of partitions with a single reserve buffer 206, which may be a buffer pool, and thereby provide avoid packet loss upon partition failure in a very efficient means.

Use of the reserve buffer may produce a saving in memory in the case when there are a plurality of M partitions. If each partition of M partitions were to have N buffer pools, then the memory required would be:

$$M*N*(\text{worst case number of frames})*\text{frame size}$$

If the suspicious condition only is detected, the memory needed is:

$$M*N*(\text{activation time number of frames})*\text{frame size}$$

The reserve buffer frame usage, for prevention, has memory requirements:

$$M*N*(\text{worst case number of frames}-\text{reserve buffer pool})*\text{frame size}+N*\text{reserve buffer pool}*\text{frame size}$$

bringing memory savings of:

$$(M-1)*N*\text{reserve buffer pool}*\text{frame size}$$

The reserve buffer frame usage for both detection and prevention is:

$$M*N*(\text{worst case number of frames}-\text{activation time number of frames}-\text{reserve buffer pool})*\text{frame size}+N*\text{reserve buffer pool}*\text{frame size}$$

Therefore overall memory savings are:

$$M*N*(\text{activation time number of frames}+\text{reserve buffer pool})*\text{frame size}-N*\text{reserve buffer pool}*\text{frame size}$$

where:

($M*N*$(activation time number of frames+reserve buffer pool)*frame size) is a saving due to the shortening of the non-served period and the shared reserve buffer pool, and (N*reserve buffer pool*frame size) is the reserve buffer pool set size.

In an embodiment, allocating the reserve buffer using a pre-determined, or network protection, threshold which is equal to one packet less than the maximum number of packets which can reside in the primary buffer allows the device to delay the decision of which partition to allocate the reserve buffer to, and this may allow a single buffer to serve partition failure among a plurality of partitions.

In an embodiment, device 201 operates according to the Ethernet protocol and devices and equipments may be connected physically by Ethernet to equivalent and other machines that have a similar nature. For example a wireless LAN may be connected to a switch, which may in turn be connected to an ADSL router. In an alternative embodiment, any other standardised networking communication system may be used, for example Hi-Gig or other system.

In an embodiment, device 201 may initialise the primary partition upon start-up. Primary partition 203 may therefore be available when device 201 is in use or in operation.

Device 201 may also include an input/output component or interface 211 to connect device 201 to wider multi-partition networking system 212 which may comprise a collection or group of other devices or network nodes.

Figure 4:
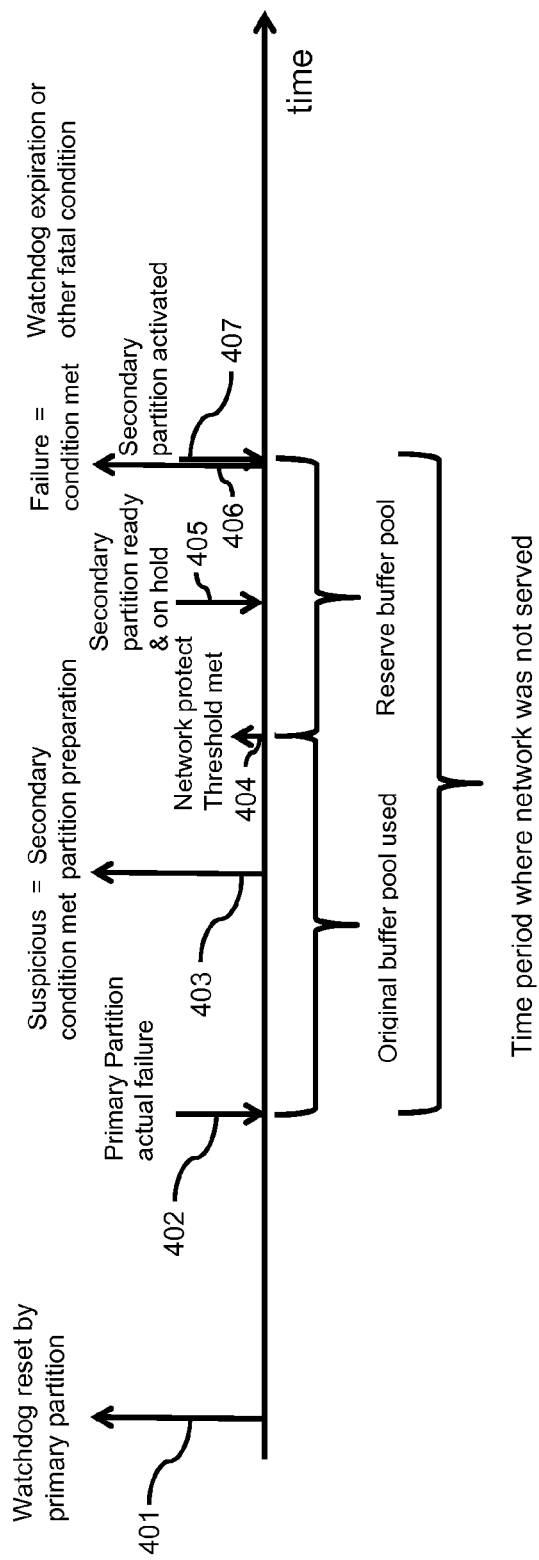
FIG. 4 schematically shows an embodiment of operation of partitions and buffers.

FIG. 4 shows schematically an exemplary embodiment of a time line showing operation of a device. Under normal operation a partition, for example primary partition 203, sets a watchdog 401. A watchdog may be set regularly by the primary partition to indicate that it is still working. However, in the example shown in FIG. 4 the primary partition fails 402. At some time 403 the device may detect a suspicious condition and may initialise, set in motion or otherwise make ready the secondary partition for operation. In this embodiment shown the reserve buffer might not be allocated to the primary buffer as soon as a suspicious condition is detected and the primary partition continues to use the primary, or original, buffer. At a later time 404 a pre-determined, or network protection, threshold is met and the device may allocate the reserve buffer for use by the primary partition. The combination of primary buffer and reserve buffer may allow more space for temporary storage of packets until such time as either the primary partition is determined not to have failed, or, the primary partition is replaced by the secondary partition. At some time 405 later the secondary partition is ready and on hold. At some time 406 later the failure of the primary partition may be detected by the expiration of the watchdog which has not been reset by the partition, the partition having failed and the secondary partition may be activated at time 407 which occurs immediately, or sufficiently immediately, after time 406 or as soon as is reasonably achievable after time 406.

The operational tasks of the primary partition may then be transferred to the secondary partition and the primary buffer and reserve buffer may be allocated to the secondary partition. The secondary partition may then continue the work, or tasks, of the primary partition, fed from the temporarily stored packets which are in the primary and reserve buffers.

Embodiments described therefore may improve high availability systems, that is systems with a built in degree of failsafe, by allocating extra, or reserve, memory resources to elements of the operating systems when they are deemed to be at risk of packet drop.

Figure 5:
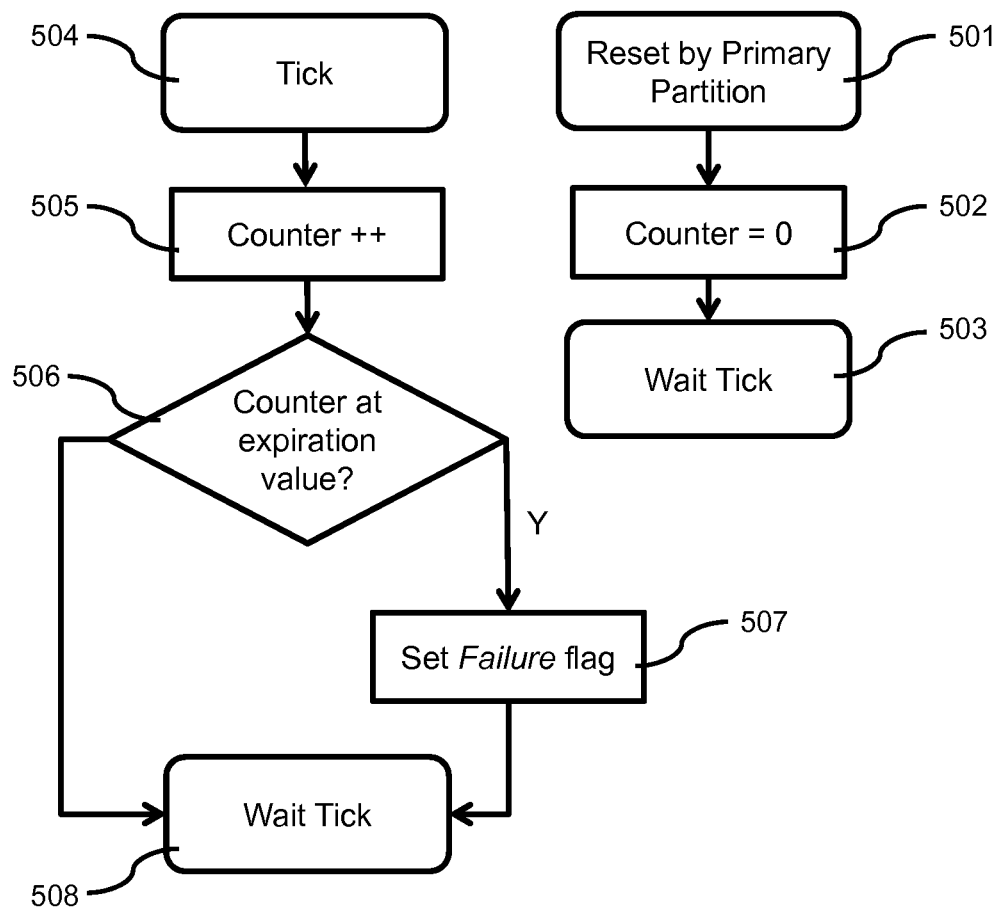
FIG. 5 schematically shows an embodiment of workflow.

An embodiment of watchdog workflow is schematically shown in FIG. 5. The watchdog is typically reset 501 by the primary partition and a counter resets to zero 502 and waits for the next reset 503. At the same time the device may detect the watchdog and may register a tick 504, wait for a counter 505 and check the tick at expiration of the counter 506. If the watchdog has failed the counter reaches expiration and a failure flag may be set 507. If the watchdog has not failed the device simply waits for the next tick to indicate that the partition is operational 508. However, even if the failure flag is set the device may still wait for the next tick 508 because this will indicate that the partition is operational again and can maintain or resume working of tasks.

Figure 6:
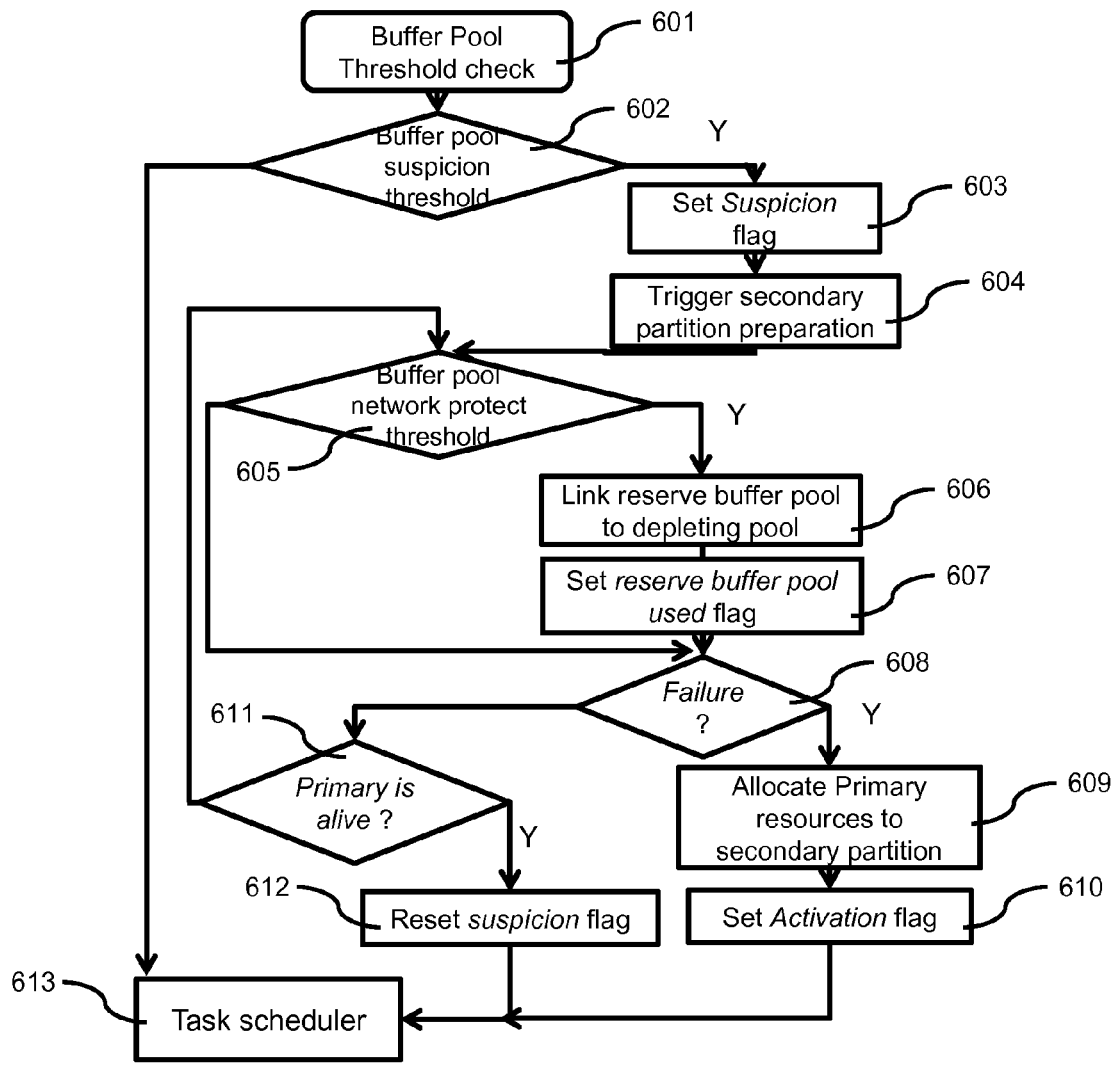
FIG. 6 schematically shows an embodiment of workflow.

An exemplary embodiment of workflow for threshold detection in a buffer, or buffer pool, is shown schematically in FIG. 6. At start 601 the device may detect that a first pre-determined threshold has been reached 602. This may be the suspicion threshold and indicates that the buffer pool is filling up. A suspicion flag may be set 603 and in an embodiment a secondary partition is set into preparation 604. If the device then detects, in an embodiment, a second pre-determined threshold, 605, which may be a network protection threshold, it may allocate the reserve buffer to the primary buffer serving the partition 606 by, in an embodiment, linking the reserve buffer pool to the primary buffer pool. The device may set a reserve buffer pool used flag 607. Regardless of whether or not the device detects the second pre-determined threshold, the device may at some point later detect failure 608 of the primary partition and if this occurs the device allocates the resources of the primary partition to the secondary partition 609 and sets an activation flag 610. If failure does not occur the primary partition may still be alive 611 and the device may still detect the network protection threshold 605. Alternatively the suspicion flag is reset 612. Finally a task scheduler, which may be a manager or management complex or other processor situated on the device manages the tasks and sends them to the correct partition.

Figure 7:
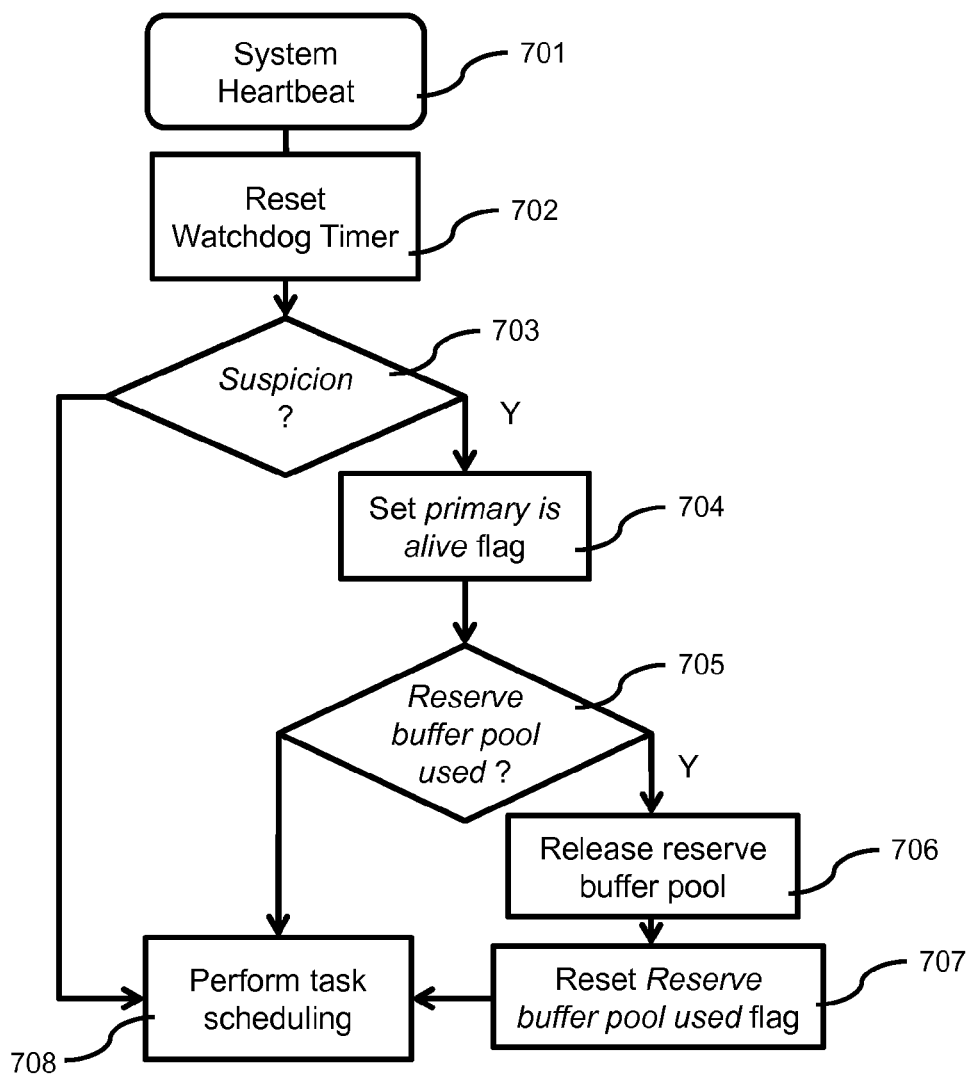
FIG. 7 schematically shows an embodiment of workflow.

FIG. 7 schematically shows an exemplary embodiment of a workflow for a heartbeat check for a primary partition which starts at 701 with a reset 702 of the watchdog timer. If the partition is deemed to be in a suspicious state 703 a flag is set 704 and if the reserve buffer has been used 705 it is released 706 and a Reserve buffer pool used flag is removed 707 and task scheduling resumes.

Figure 8:
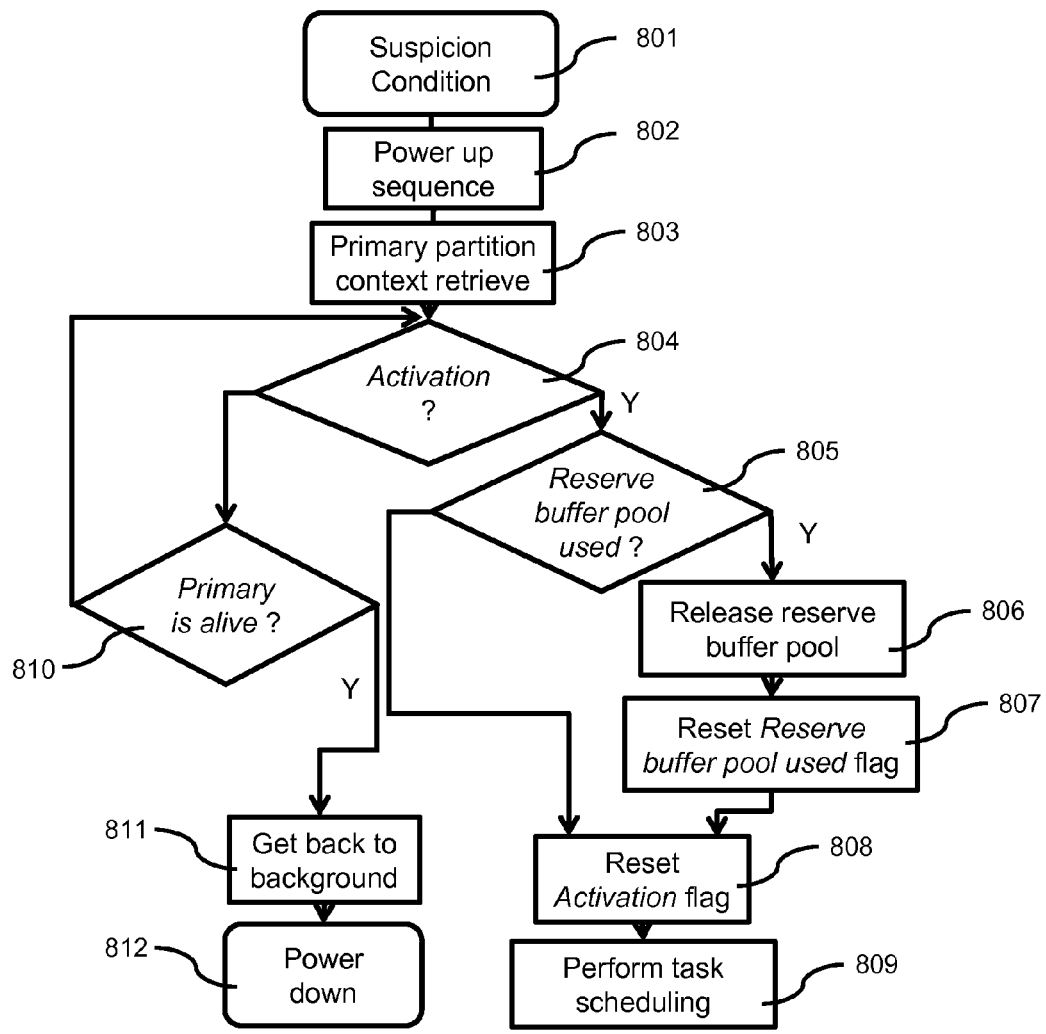
FIG. 8 schematically shows an embodiment of workflow.

FIG. 8 schematically shows an exemplary embodiment of workflow comprising a secondary partition. The workflow starts with detection of a suspicious condition 801. The secondary partition power up sequence starts 802 and the primary partition context may be retrieved 803. If the secondary partition is subsequently activated 804 and the reserve buffer pool has been used 805 the reserve buffer pool may be released to the secondary partition 806 and a Reserve buffer pool used flag may be reset 807. An activation flag may be reset 809 and task scheduling is performed 810 in relation to the secondary partition and its buffers. If the reserve buffer has not been used 805 there is no need to make the reserve buffer available to the secondary partition and the workflow moves straight to reset of the activation flag 809. If the secondary partition is not activated 804 and the primary is determined to be alive 811 the secondary partition returns to background 812 and powers down 813.

Figure 9:
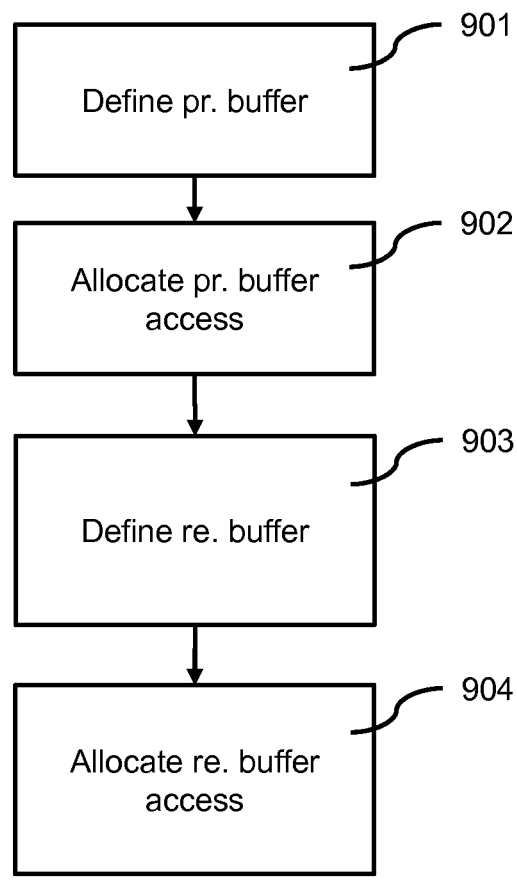
FIG. 9 schematically shows a computer readable medium comprising a computer program product.

FIG. 9 schematically shows an embodiment of a method, which may be suitable for operating a multi-partition networking system which comprises a primary partition and a memory.

In an embodiment the method comprises defining 901 a primary buffer within the memory, followed by allocating 902 access to the primary buffer by the primary partition, defining 903 a reserve buffer in the memory and allocating 904 access to the reserve buffer by the primary partition when at least a suspicious condition is detected in the primary partition.

Figure 10:
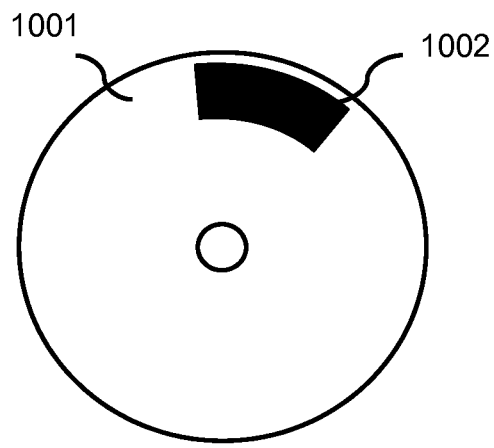
FIG. 10 schematically shows a non-transitory tangible computer readable storage medium.

FIG. 10 shows a computer readable medium 1001 comprising a computer program product 1002, the computer program product 1002 comprising instructions for causing a processor apparatus to perform a method of defining a primary buffer within the memory, allocating access to the primary buffer by the primary partition, defining a reserve buffer in the memory and allocating access to the reserve buffer by the primary partition when at least a suspicious condition is detected in the primary partition.

Figure 11:
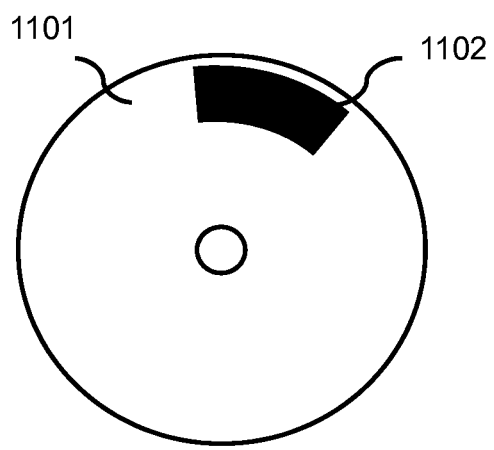
FIG. 11 schematically shows an embodiment of a method.

The computer program product 1002 may be embodied on the computer readable medium 1001 as physical marks or by means of magnetization of the computer readable medium 1001. However, any other suitable embodiment is conceivable as well. Furthermore, it will be appreciated that, although the computer readable medium 1001 is shown in FIG. 10 as an optical disc, the computer readable medium 1001 may be any suitable computer readable medium, such as a hard disk, solid state memory, flash memory, etc., and may be non-recordable or recordable. The computer readable medium may also be a non-transitory tangible computer readable storage medium as shown schematically in FIG. 11. Non-transitory tangible computer readable storage medium 1101 may comprise data 1102 loadable in or into a programmable apparatus, and representing instructions executable by the programmable apparatus. The instructions may comprise one or more operating instructions for operating a primary partition, one or more defining instructions for defining a reserve buffer in a memory, one or more detection instructions for detecting at least a suspicious condition in a primary partition, and one or more allocation instructions for allocating the reserve buffer to the primary partition.

With regard to details of the network, an operating system (OS) is the software that manages the sharing of the resources of the network and provides programmers with an interface used to access those resources. An operating system processes system data and user input, and responds by allocating and managing tasks and internal system resources as a service to users and programs of the system.

The invention may also be implemented in a computer program for running on a computer system within a network, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-ROM or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details have not been explained in any greater extent than that considered necessary, for the understanding and appreciation of the underlying concepts of the present invention and in order not to obfuscate or distract from the teachings of the present invention.

The term "program," as used herein, is defined as a sequence of instructions designed for execution on a computer system or network. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Furthermore, although the Figures herein and the discussion thereof describe an exemplary information processing architecture, this exemplary architecture is presented merely to provide a useful reference in discussing various aspects of the invention. The description of the architecture has been simplified for purposes of discussion and is one of many different types of appropriate architectures that may be used in accordance with the invention. Those skilled in the art will recognize that the boundaries between blocks of components are merely illustrative and that alternative embodiments may merge blocks or circuit elements or impose an alternate decomposition of functionality upon various blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of computer readable media such as memory or other media on other computer systems. Such computer readable media may be permanently, removably or remotely coupled to a device or management processor as described. The computer readable media may include, for example and without limitation, any number of the following: magnetic storage media including disk and tape storage media; optical storage media such as compact disk media (e.g., CD ROM, CD R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

Also, devices functionally forming separate devices may be integrated in a single physical device. Also, the units and circuits may be suitably combined in one or more semiconductor devices.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A multi-partition networking device for operating a multi-partition networking system, the device arranged to couple to a memory, the device comprising:
   a primary partition; and
   a management processor arranged to:
   define a primary buffer within the memory;
   allocate access to the primary buffer by the primary partition;
   define a reserve buffer in the memory; and
   allocate access to the reserve buffer by the primary partition when at least a suspicious condition is detected in the primary partition, wherein detection of the suspicious condition comprises detection that the primary buffer is filled to a pre-determined packet limit, and wherein the pre-determined packet limit comprises a value equal to one packet less than the maximum number of packets that the primary buffer can hold.

2. The multi-partition networking device of claim 1 wherein detection of the suspicious condition comprises or consists of detection that the primary buffer is not being served.

3. The multi-partition networking device of claim 1 wherein detection of the suspicious condition comprises or consists of detection that packets are not flowing into or out of the primary partition.

4. The multi-partition networking device of claim 1 wherein the reserve buffer comprises a buffer pool.

5. The multi-partition networking device according to claim 1 further comprising a secondary partition, the management processor arranged to:
   initialise the secondary partition when the suspicious condition is detected;
   transfer operational tasks of the primary partition to the secondary partition and allocate the primary buffer and reserve buffer to the secondary partition, when a failure condition is detected in the primary partition.

6. The multi-partition networking device of claim 1 comprising a plurality of further partitions.

7. The multi-partition networking device of claim 1 arranged to operate according to an Ethernet protocol.

8. The multi-partition networking device of claim 1 arranged to initialise the primary partition upon start-up.

9. A multi-partition networking system comprising:
   a multi-partition networking device according to claim 1; and
   a memory coupled to the multi-partition networking device.

10. An integrated circuit comprising:
    at least one multi-partition networking device according to claim 1.

11. A method of operating a multi-partition networking system which comprises:
    a primary partition;
    a memory,
    the method comprising:
    defining a primary buffer within the memory;
    allocating access to the primary buffer by the primary partition;
    defining a reserve buffer in the memory;
    allocating access to the reserve buffer by the primary partition when at least a suspicious condition is detected in the primary partition; and
    detecting the suspicious condition by detecting that the primary buffer is filled to a pre-determined packet limit, wherein the pre-determined packet limit is a value equal to one packet less than the maximum number of packets that the primary buffer can hold.

12. The method of claim 11 comprising:
    detecting the suspicious condition by detecting an indication that the primary buffer is not being served.

13. The method of claim 11 comprising:
    detecting the suspicious condition by detecting an indication that packets are not flowing into or out of the primary partition.

14. The method of claim 11 according to any previous claim wherein the multi-partition networking system also comprises:
    a secondary partition arranged to access a memory;
    the method comprising:
    initialising the secondary partition for operation when the suspicious condition is detected;
    transferring the operational tasks of the primary partition to the secondary partition, and
    allocating the primary buffer and reserve buffer to the secondary partition, when a failure condition is detected in the primary partition.

15. A computer program product comprising instructions on a non-transitory medium for causing a management processor to couple to:
a primary partition; and
a memory; and
to perform the method of:
defining a primary buffer within the memory;
allocating access to the primary buffer by the primary partition;
defining a reserve buffer in the memory;
allocating access to the reserve buffer by the primary partition when at least a suspicious condition is detected in the primary partition; and
detecting the suspicious condition by detecting that the primary buffer is filled to a pre-determined packet limit, wherein the pre-determined packet limit is a value equal to one packet less than the maximum number of packets that the primary buffer can hold.

16. A non-transitory tangible computer readable storage medium comprising data loadable in a programmable apparatus, the data representing instructions executable by the programmable apparatus, said instructions comprising:
one or more operating instructions for operating a primary partition;
one or more defining instructions for defining a reserve buffer in a memory;
one or more detection instructions for detecting at least a suspicious condition in a primary partition, wherein the suspicious condition is detected by detecting that the primary buffer is filled to a pre-determined packet limit, and wherein the pre-determined packet limit is a value equal to one packet less than the maximum number of packets that the primary buffer can hold; and
one or more allocation instructions for allocating the reserve buffer to the primary partition.

* * * * *